Patented June 14, 1938

2,120,799

UNITED STATES PATENT OFFICE 2,120,799

METALLIZED ORANGE TO BROWN AZO DYES

Moses L. Crossley, Plainfield, and Lincoln M. Shafer, Highland Park, N. J., assignors to The Calco Chemical Company, Inc., Bound Brook, N. J., a corporation of Delaware No Drawing. Application August 3, 1935, Serial No. 34,598

19 Claims. (Cl. 260—11)

This invention relates to new orange to brown azo dyes containing metals in stable combination and suitable for the production of fast colors on animal fibers.

In the past it has been proposed to couple nitro diazophenols with phenyl methyl pyrazolones in alkaline solution, the dyes then being treated with chromium compounds. The metallized dyes obtained dye animal fibers a dull brown color.

According to the present invention, we have found that when nitro diazophenols are coupled with phenyl methyl pyrazolones in weak acid solution instead of alkaline solution, dyes are obtained which when metallized with chromium give bright orange shades and when treated with other metals, such as copper and nickel, give valuable colors. When metallized with iron and manganese orange brown to rich brown colors are obtained which differ from the dull brown chromium treated dyes obtained by coupling in alkaline solution. We do not know precisely what the chemical differences are in the new dyes as it is not known just where and how the metal is united with the azo dye. In both cases, the metal forms a part of the molecule and is not a mere salt of acid groups. It seems probable that in the acid coupled azo dye, the metal enters into a different part of the molecule but this is not susceptible of definite proof and is advanced merely as a probable explanation, it being understood that the invention is in no sense limited to any such theory.

We have found that the coupling can be effectively carried out in the presence of ordinary organic acids such as for example, formic or acetic acid, the latter giving particularly good results. The metallization is accomplished by heating the azo dye with an aqueous solution of a salt of the respective metal or combination of metals. The metallized product, in the case of water soluble azo dye, is also water soluble and is salted out of solution with sodium chloride or sodium sulfate. Among the metals which give desirable products are the following:

Chromium
Copper
Cobalt
Nickel
Iron
Manganese
Aluminum
Cadmium
Tin
Mercury
Titanium
Tungsten
Zirconium
Molybdenum
Antimony
Tellurium Combination of metals also give good results and particularly desirable combinations are the following:

Chromium and vanadium
Chromium and nickel
Chromium and manganese
Chromium and cobalt
Chromium and copper
Chromium and titanium
Chromium and tin
Chromium and iron
Copper and vanadium
Copper and zinc
Aluminum and tin The ratio of the metal or metal complex to the dye may vary within wide limits, depending upon the nature of the metal, the shade desired, and the degree of fastness required. By introducing more than one metal in the molecular complex of the dye, the tone of the color can be varied within the limits of bright orange to dark brown.

The metallizing agent may be a water soluble salt of the metal or metal complex or an insoluble freshly precipitated hydrate of the metal, and the metallization may be accomplished with or without the aid of solubilizing agents for the metallic compound. The metallization may be carried out in neutral, acid or alkaline media. The time of boiling and conditions may vary within wide limits.

The dyes formed in accordance with the invention are brownish powders which are soluble in water and dye animal fibers from an acid bath orange to brown colors of excellent fastness to washing, milling and light.

The following examples illustrate the invention. They in no wise limit its scope. The parts given are by weight.

Example 1

35 parts of the dye obtained by coupling 1-(4'-sulfophenyl)-3-methyl-5-pyrazolone with diazotized 4-nitro-2-amino-1-phenol in dilute acetic acid medium, (pH approximately 4.7) are suspended in 1000 parts of water along with 40 parts of chromous acetate and heated to a boil for three hours. The resulting metallized product is isolated by salting out with an amount of salt equivalent to about 25% of the volume of the aqueous solution. On filtering and drying the separated dye, a reddish brown powder is obtained which dyes animal fibers from an acid bath medium tones of orange of excellent fastness.

Example 2

40 parts of the dye obtained by coupling in dilute organic acids, (pH of approximately 4) diazotized 4-nitro-2-amino-1-phenol with 1-(4'-sulfophenyl)-3-methyl-5-pyrazolone is suspended in 1200 parts of water along with 22 parts of CuSO₄ crystals and 12 parts of sodium acetate. The solution is boiled for 1 hour and the resulting product is salted out of solution with sodium chloride. The resulting dye is a yellowing powder, soluble in water with a yellow color, and dyes animal fibers yellow-orange shades of exceptional fastness, especially to light.

Similar results are obtained by substituting for copper: nickel, cobalt, vanadium, titanium, zirconium, aluminum, tin, iron.

*Example 3*

42 parts of the dye obtained by coupling 1-(3'-sulfophenyl)-3-methyl-5-pyrazolone with diazotized 4-nitro-2-amino-1-phenol in dilute organic acid medium, (pH approximately 5) is suspended in 1000 parts of water along with 22 parts of sodium acetate, 25 parts of copper sulfate crystals and 27 parts of CrSO₄.7H₂O. The solution is boiled for one hour and the resulting product is salted out by adding an amount of ammonium sulfate equivalent to about 35% of the volume of the solution. The dry dye is a brownish powder, soluble in water and dyes animal fibers tones of orange fast to light and milling.

Other combinations of metals can be employed, such as Cr and Ni, Ni and Cu, Mn and Cu, etc.

*Example 4*

40 parts of the dye obtained by coupling diazotized 4-nitro-2-amino-1-phenol with 1-(4'-sulfophenyl)-3-methyl-5-pyrazolone is suspended in about 1200 parts of water and 30 parts of iron sulfate crystals with about 25 parts of sodium acetate. The solution is boiled for about 1 hour and the resulting product is salted out of solution with sodium chloride. When dry, the product is a brownish powder soluble in water and dyes animal fibers olive tones of brown of exceptional fastness to light.

*Example 5*

40 parts of dye obtained by coupling in organic acid solution, (pH approximately 4.7) diazotized 4-nitro-2-amino-1-phenol with 1-(4'-sulfophenyl-2',5'-dichlor)-3-methyl-5-pyrazolone with 1500 parts of water are stirred with about 14 parts of sodium acetate crystals and then an aqueous solution containing about 13 parts of chromium fluoride is added. The mixture is boiled for several hours. It is then cooled to about 45° C. and the metallized dye salted out of solution with sodium chloride. The precipitated dye is filtered and dried. It is an orange powder which is soluble in water and which dyes wool and other animal fibers from an acid bath reddish tones of orange of excellent fastness to light, fulling and carbonizing. The chromium may be substituted by copper, nickel, cobalt, or combinations of chromium and these metals. It also can be substituted by iron or manganese, in which cases the resulting dye produces olive tones of brown on wool and other animal fibers. These dyes are particularly suitable for dyeing leather.

The following table indicates the shades obtained by reacting various metals and combinations of metals on the above-mentioned azo dye:

| Metal used | Shade | Metal used | Shade |
|---|---|---|---|
| Cr | Reddish brown. | Mo | Bright medium orange. |
| Cu | Yellowish orange. | Sb | Medium orange. |
| Fe''' | Olive brown. | Te | Medium orange. |
| Al | Bright medium orange. | V | Yellowish orange. |

| Metal used | Shade | Metal used | Shade |
|---|---|---|---|
| Ni | Medium orange. | Cr-Cu | Medium orange. |
| Mn | Brownish orange. | Cr-Al | Bright reddish orange. |
| Co | Orange. | Cr-Mn | Reddish orange. |
| Cd | Medium orange. | Cr-Co | Medium orange. |
| Sn | Medium orange. | Cr-V | Bright medium orange. |
| Hg | Medium orange. | Cu-V | Yellowish orange. |
| Tungsten | Medium orange. | Cu-Ni | Medium orange. |
| Fe'' | Olive brown. | Cr-Fe | Medium brown. |
| Zr | Medium orange. | Cr-Ti | Yellowish orange. |
| Ti | Medium orange. | Cr-Sn | Reddish orange. |

Similar shades are obtained with the dyes of Examples 1 to 4.

We claim:—

1. A method of preparing metallized dyes which comprises diazotizing an orthoamino nitrophenol and coupling in weak acid solution, (having a pH of approximately 3.6 to 6) with a phenyl methyl pyrazolone and then treating the azo dye obtained with a compound of a metal capable of metallizing the dye.

2. A method of preparing metallized dyes which comprises diazotizing an orthoamino nitrophenol and coupling in weak acid solution, (having a pH of approximately 3.6 to 6) with a sulfophenyl methyl pyrazolone and then treating the azo dye obtained with a compound of a metal capable of metallizing the dye.

3. Metallized dyes capable of dyeing animal fibers orange to brown shades obtained by coupling diazotized orthoamino nitrophenol with a phenyl methyl pyrazolone in weak acid solution, (having a pH of approximately 3.6 to 6) and then metallizing the dye.

4. Metallized dyes capable of dyeing animal fibers orange to brown shades obtained by coupling diazotized orthoamino nitrophenol with a sulfophenyl methyl pyrazolone in weak acid solution, (having a pH of approximately 3.6 to 6) and then metallizing the dye.

5. Metallized dyes capable of dyeing animal fibers orange to brown shades obtained by coupling diazotized orthoamino-4-nitrophenol with a phenyl methyl pyrazolone in weak acid solution, (having a pH of approximately 3.6 to 6) and then metallizing the dye.

6. Metallized dyes capable of dyeing animal fibers orange to brown shades obtained by coupling diazotized orthoamino-4-nitrophenol with a sulfophenyl methyl pyrazolone in weak acid solution, (having a pH of approximately 3.6 to 6) and then metallizing the dye.

7. Metallized dyes capable of dyeing animal fibers orange to brown shades obtained by coupling diazotized orthoamino-4-nitrophenol with a 1-(4'-sulfophenol)-3-methyl-5-pyrazolone in weak acid solution, (having a pH of approximately 3.6 to 6) and metallizing the azo dye.

8. Metallized dyes capable of dyeing animal fibers orange to brown shades obtained by metallizing an azo dye prepared by coupling diazotized orthoamino nitrophenol with a phenyl methyl pyrazolone with a plurality of metals taken from the group consisting of Cr, Cu, Fe'', Al, Ni, Mn, Co, Cd, Sn, Hg, W, Fe''', Zr, Ti, Mo, Sb, Te and V.

9. Metallized dyes capable of dyeing animal fibers orange to brown shades obtained by metallizing an azo dye prepared by coupling diazotized orthoamino nitrophenol with sulfophenyl methyl pyrazolone with a plurality of metals taken from the group consisting of Cr, Cu, Fe'', Al, Ni, Mn, Co, Cd, Sn, Hg, W, Fe''', Zr, Ti, Mo, Sb, Te and V.

10. Metallized dyes capable of dyeing animal fibers orange to brown shades obtained by metallizing an azo dye prepared by coupling diazotized orthoamino-4-nitrophenol with sulfophenyl methyl pyrazolone with a plurality of metals taken from the group consisting of Cr, Cu, Fe'', Al, Ni, Mn, Co, Cd, Sn, Hg, W, Fe''', Zr, Ti, Mo, Sb, Te and V.

11. Metallized azo dyes obtained by metallizing an azo dye prepared by coupling a diazotized orthoamino nitrophenol with a phenyl methyl pyrazolone with an iron compound.

12. Metallized azo dyes obtained by metallizing an azo dye prepared by coupling a diazotized orthoamino nitrophenol with a phenyl methyl pyrazolone with a ferric compound.

13. Metallized azo dyes obtained by metallizing an azo dye prepared by coupling with a diazotized orthoamino nitrophenol with a phenyl methyl pyrazolone in weak acid solution, (having a pH of approximately 3.6 to 6) with a ferric compound.

14. Metallized azo dyes obtained by metallizing an azo dye prepared by coupling a diazotized orthoamino nitrophenol with a sulfophenyl methyl pyrazolone in weak acid solution, (having a pH of approximately 3.6 to 6) with a ferric compound.

15. Metallized azo dyes obtained by metallizing an azo dye prepared by coupling a diazotized orthoamino-4-nitrophenol with 1-(4'-sulfophenyl-2',5-dichlor)-3-methyl-5-pyrazolone in organic acid solution with a ferric compound.

16. Metallized azo dyes obtained by metallizing an azo dye prepared by coupling a diazotized orthoamino nitrophenol with 1-(4'-sulfophenyl-2',5-dichlor)-3-methyl-5-pyrazolone in organic acid solution with a ferric compound.

17. Metallized azo dyes obtained by metallizing an azo dye prepared by coupling a diazotized orthoamino-4-nitrophenol with 1-(4'-sulfophenyl-2',5-dichlor)-3-methyl-5-pyrazolone in organic solution with a manganese compound.

18. Metallized dyes capable of dyeing animal fibers orange to brown shades obtained by coupling diazotized orthoamino nitrophenol with a sulfophenyl methyl pyrazolone in weak acid solution, (having a pH of approximately 3.6 to 6) and then metallizing the dye with chromium.

19. Metallized dyes capable of dyeing animal fibers orange to brown shades obtained by coupling diazotized orthoamino-4-nitrophenol with a phenyl methyl pyrazolone in weak acid solution, (having a pH of approximately 3.6 to 6) and then metallizing the dye with chromium.

MOSES L. CROSSLEY.
LINCOLN M. SHAFER.